May 10, 1955
F. O. CARLSON
2,707,891
APPLYING DEVICE FOR EMERGENCY CHAINS
Filed May 19, 1952
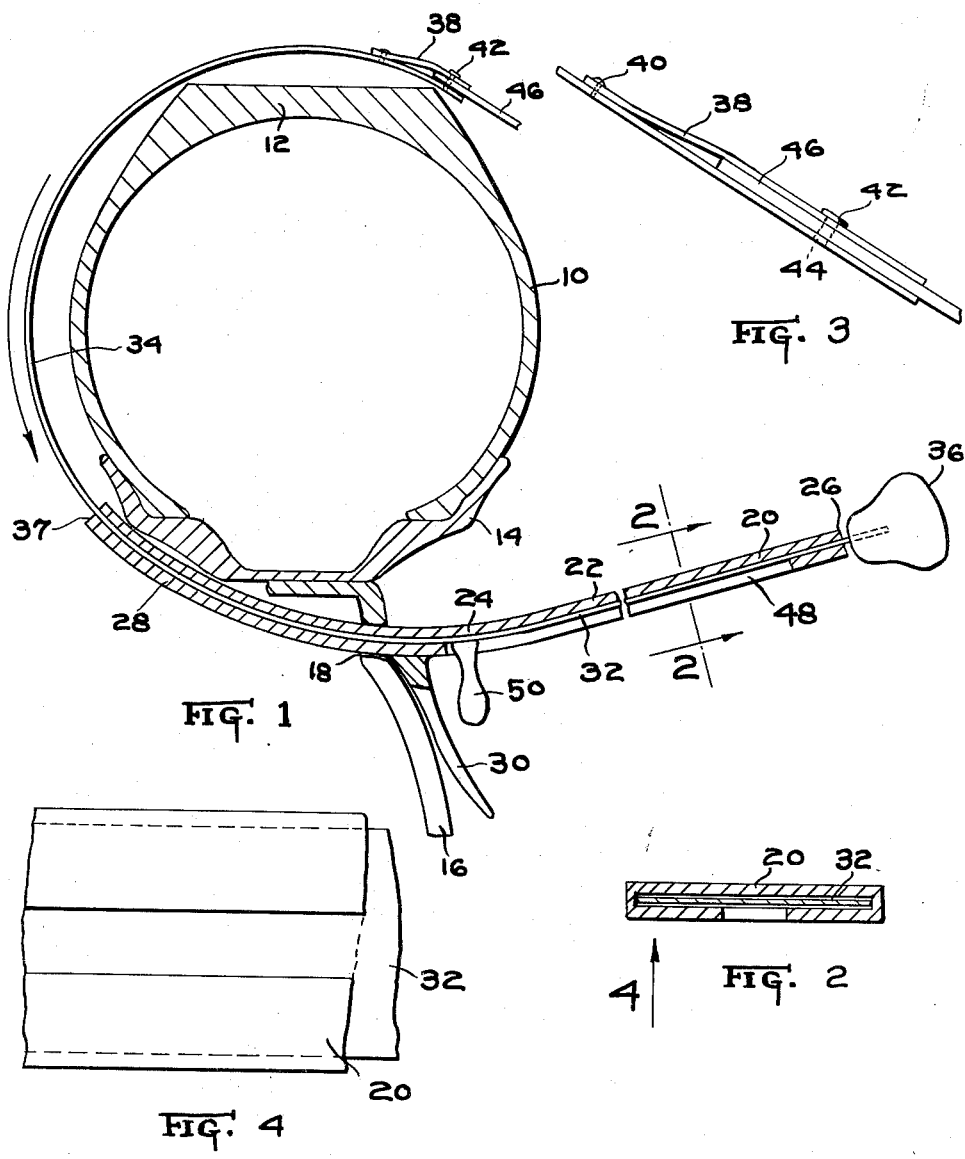
INVENTOR.
FRITZ O. CARLSON
BY
Charles R. Fay,
ATTORNEY

United States Patent Office 2,707,891
Patented May 10, 1955

2,707,891
APPLYING DEVICE FOR EMERGENCY CHAINS

Fritz O. Carlson, Leicester, Mass.

Application May 19, 1952, Serial No. 288,656

2 Claims. (Cl. 81—15.8)

This invention relates to a new and improved device for applying emergency chains to vehicle wheels with the least possible effort and with the greatest of speed and ease.

The principal object of the invention resides in the provision of a device which may be thrust partly through a vehicle wheel from the adjacent or outer side thereof, and will automatically protrude over the tread of the tire from the opposite side of the wheel, said device having means for temporarily securing thereto an emergency tire chain or strap thereof so that upon retraction of the device, the tire chain or strap is drawn back around the tread of the tire to the opposite side of the wheel and through the wheel to the adjacent or outer side, for quick and easy buckling or other securement to the wheel.

Other objects and advantages of the invention will appear hereinafter.

Reference is to be had to the accompanying drawing, in which

Fig. 1 is a sectional view through the new device and a vehicle tire illustrating the operation of the invention;

Fig. 2 is a section through the device on line 2—2 of Fig. 1;

Fig. 3 is an enlarged view in elevation of the strap securing means; and

Fig. 4 is an enlarged bottom plan view of the device, looking in the direction of arrow 4 in Fig. 2.

In the drawing, a vehicle tire is indicated at 10 and as having a tread 12, and being mounted on a wheel rim 14 of a wheel 16. This wheel as is generally customary is provided with a series of apertures 18 adjacent the rim.

The present invention consists of an elongated, flat, hollow tube, generally indicated at 20, the same being made of pressed metal, extruded metal or plastic, etc., and it has a long straight portion 22 extending from the start of a curved portion thereof at 24 to the free end 26, this portion being preferably in the nature of 8 to 10 inches long.

At the curve 24, the flat hollow tube bends around as shown in Fig. 1, forming a curved portion 28, and approximately at the start of the curve in the region 24, a stop element 30 is provided at the convex side of the device.

An elongated resilient strip having a general straight portion 32 and a curved portion 34 is located within the tube. The resilient strip 32, 34 is longer than the tube and is provided with a handle 36 at the extending end thereof at the straight portion of the tube 20, so that the resilient member is adapted to be slid in and out at either end relative to the tube. The resilient member may be made of any suitable material, but should be of such a nature that when extended from the inner end of the tube at 37, it will curve around in a clockwise direction as clearly shown in Fig. 1, i. e., it curves around in a semi-circle in the same direction as the curve of the portion 28 of the tube. When withdrawn, the resilient strip is straightened and assumes the shape of the tube.

At its extreme end, the resilient strip 32 is provided with a catch member 38 which may be riveted or welded thereto at 40 and is provided with a pin 42 taking into a hole at 44 in the strip itself. The part 38 may be lifted by the finger so as to enable the insertion therebetween of the free end of a strap 46 of an emergency tire chain. Upon release thereof, pin 42 will extend through a hole in the strap, thus securing the latter to the resilient strip, whereby the same may be drawn over the tire tread along the opposite side of the tire casing and rim and then back through the hole 18 where it may be easily secured as will be clear to the opposite end or buckle of the emergency chain.

If desired, a slot 48 may be provided for the reciprocatory guiding of the handle 50 secured to the strip 32 to provide ease in pushing the resilient strip back and forth.

In the operation of the device, the strip 32 is withdrawn to the right by handle 36, so that the fastener portion 38 approaches the end 37 of the flat tubing, and then this end of the device is thrust through the hole 18 from the adjacent or outer side of the wheel to the opposite side thereof as shown. The handle 36 is then manipulated to push the spring strip so as to extend the curved end thereof from the end 37 of the tubing, and by this means, the end 38 is brought around over the tread of the tire because there is no other place for the same to go. In this position, which is shown in Fig. 1, the strap is attached as above described, the handle is retracted and the chain is ready to be buckled on.

What I claim is:

1. Device for applying emergency chains to vehicle wheels comprising an elongated rigid relatively narrow tube having a substantially straight portion and a generally angular portion at one end thereof, the latter being capable of being thrust through a wheel from one side to the other, so that the angular portion extends to the other side of the wheel and may extend in a general radial direction away from the wheel hub, a relatively stiff resilient strip of material in the tube and slidable therein, said strip being permanently pre-coiled in the direction of the angular tube portion so that upon being extended in part from the tube at the end of the angular tube portion the strip extends in a direction generally back toward the straight tube portion and over the wheel rim in a direction reverse to that of the angular portion of the tube, means at the extended end of the resilient strip to secure an emergency chain or the like, and means to retract the resilient strip relative to the tube and the device from the wheel, drawing the secured end of the emergency chain or the like over the wheel rim to the other side of the wheel and back through the latter to the said one side thereof.

2. The device of claim 1 including a slot in the straight portion of the tube, and a handle on the strip intermediate the ends thereof and working in the slot.

References Cited in the file of this patent

UNITED STATES PATENTS

| Number | Name | Date |
|---|---|---|
| 285,304 | Pearson | Sept. 18, 1883 |
| 419,635 | Butts | Jan. 21, 1890 |
| 1,606,602 | Stauffer | Nov. 9, 1926 |
| 1,858,176 | Webb | May 10, 1932 |
| 2,257,657 | Spahr | Sept. 30, 1941 |
| 2,293,650 | Hudson | Aug. 18, 1942 |
| 2,567,429 | Green | Sept. 11, 1951 |